Oct. 14, 1958     B. LASSMAN     2,855,628
PRESSURE BONDING SYSTEM FOR SOLID PARTICLES
Filed Aug. 17, 1953     4 Sheets-Sheet 1
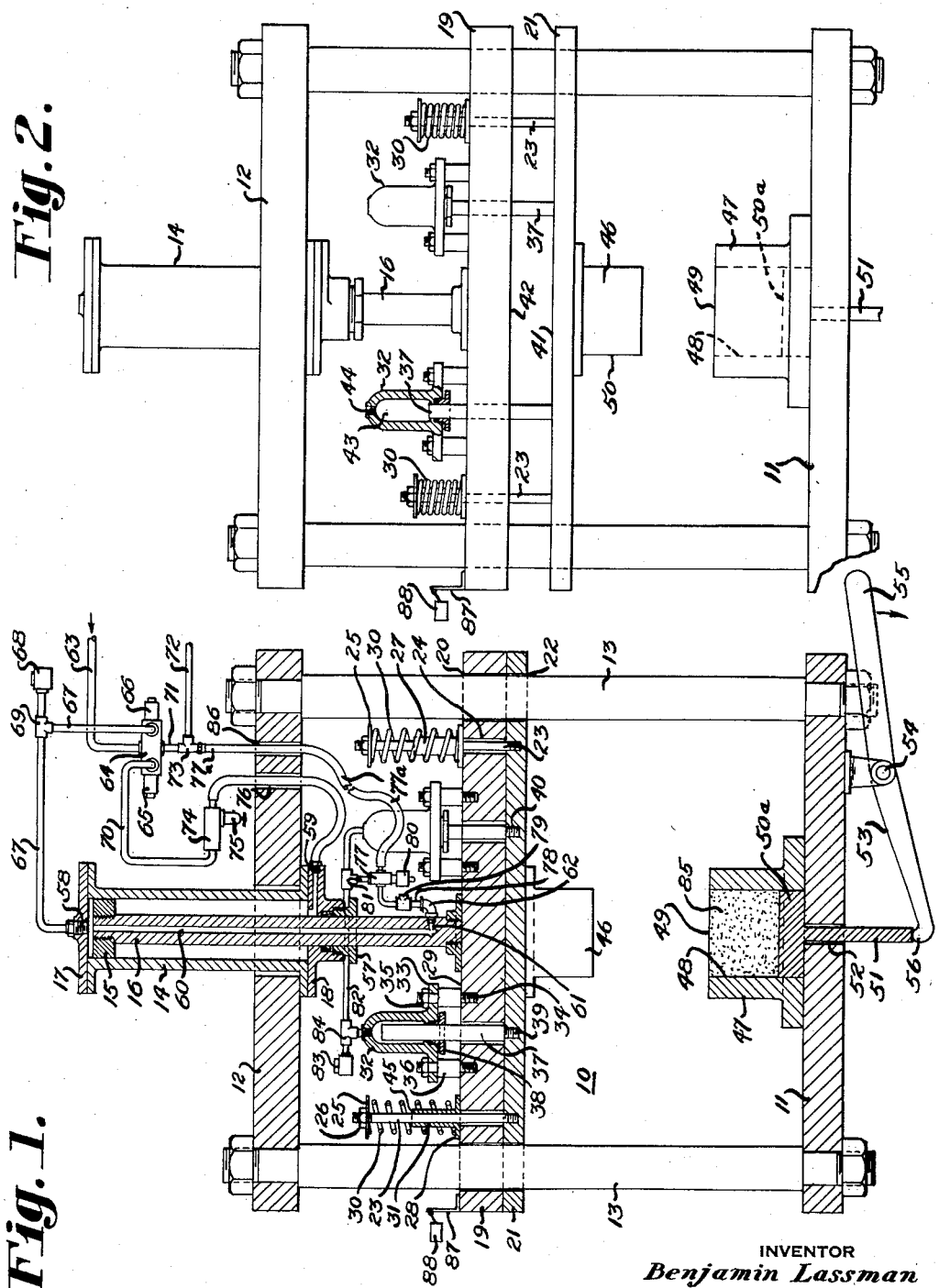
INVENTOR
Benjamin Lassman
by Hooper Leonard & Buell
his attys.

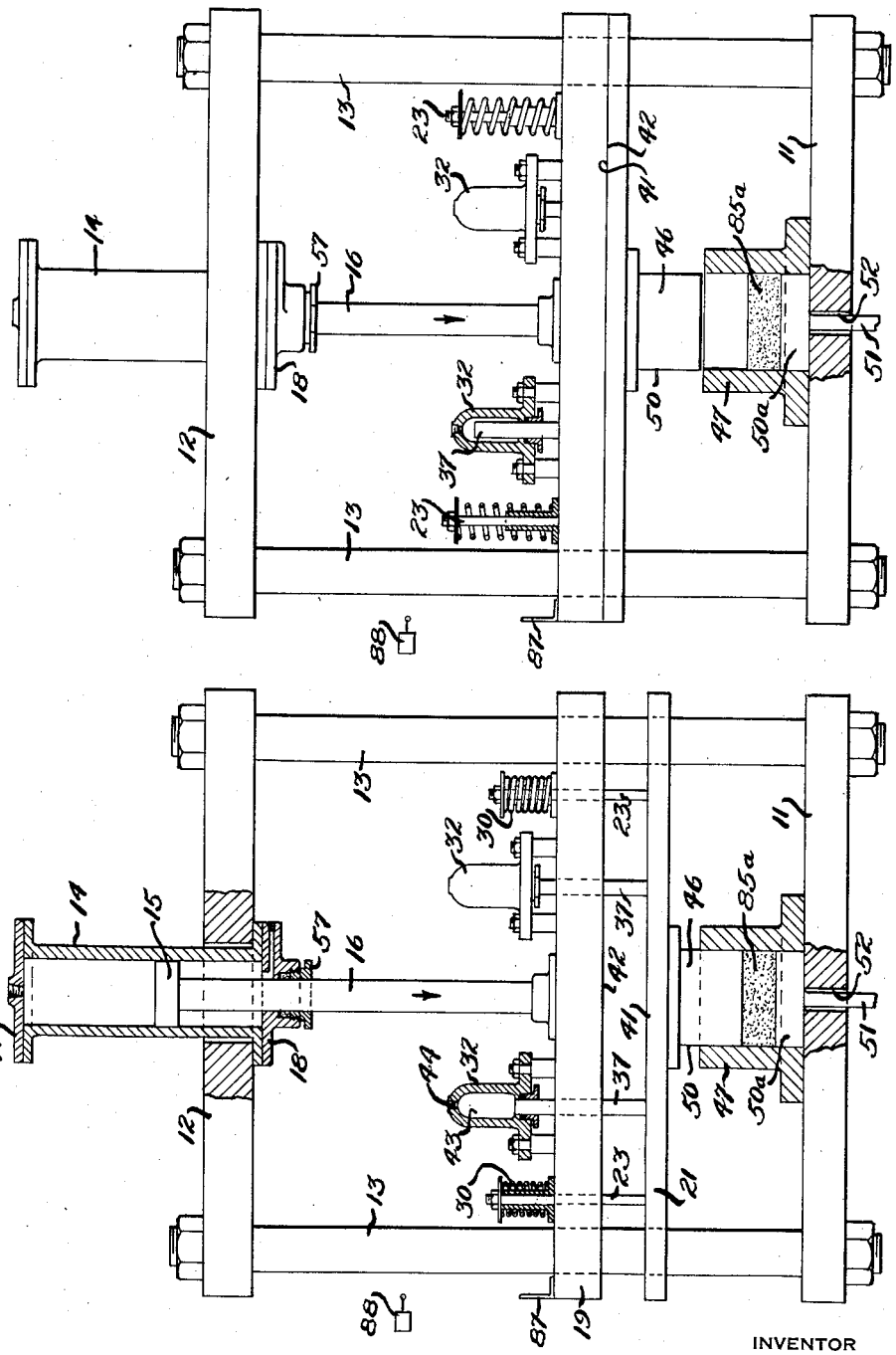

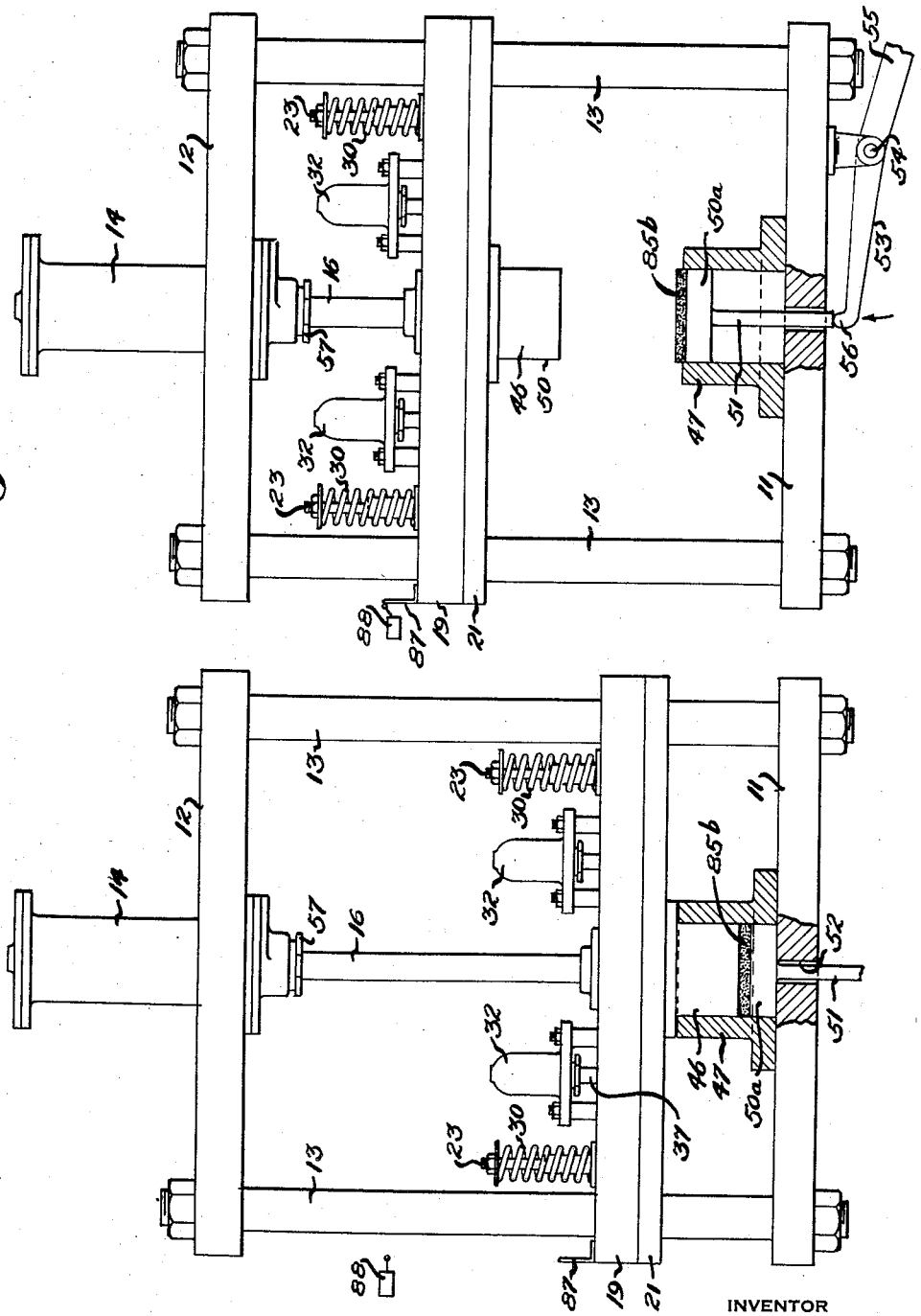

INVENTOR
Benjamin Lassman

United States Patent Office 2,855,628
Patented Oct. 14, 1958

2,855,628

PRESSURE BONDING SYSTEM FOR SOLID PARTICLES

Benjamin Lassman, Pittsburgh, Pa., assignor to Benjamin Lassman & Son, Glenshaw, Shaler Township, Pa., a Pennsylvania partnership Application August 17, 1953, Serial No. 374,711

9 Claims. (Cl. 18—16)

This invention relates to a pressure bonding system for solid particles in which such particles are first degasified or deaired prior to final compression. More particularly, this invention pertains to a new press and method in which a main platen and parts continuously move in a single direction during a compression stroke while a second member is movable relative thereto to effect such degasification and/or deairing.

Many solid materials in powdered or granular form are reasonably adapted to pressure forming. Thus, certain refractory shapes, some ceramic tiles, certain electric porcelains and some powdered metals lend themselves exceedingly well to pressure bonding which in some cases may involve the use of relatively high pressure. In the case of the named materials and the many others lending themselves to such compression bonding, the contained air or other gas among the solid particles should be removed to make the compressed material more dense and in some cases to avoid laminating and cleavage planes which would render the final compressed products unsuitable for their intended use. Even in the case of pottery materials such as potter's clay or slip, a low liquid content is desirable to reduce porosity in the final article. Otherwise, pores may develop where the water or such liquid previously was prior to the drying of the moist material. Hence, even in the case of those materials to be pressure bonded when they are in a state containing some liquid, the present invention may be used to advantage.

Heretofore, degassing and deairing has been effected in many cases, for example, by vacuum pumping means. In those situations there is not only the cost of creating the vacuum but the distribution of the evacuating openings in the compression mold has to be done with relatively great precision. Moreover, since the mold is usually not closed in absolute synchronism with the application of the vacuum, leakage may and does occur from the surrounding atmosphere. Moreover, with very fine particles a vacuum apparatus may disturb an otherwise homogeneous dispersion of coarser and finer particles throughout the material to be bonded with detriment to the final product. Or, in some cases, very fine particles may actually be sucked out of the material to be compressed within the mold. Degassing and deairing before final compression may also be performed by pressure and one example of such a prior practice is shown in my Patent No. 2,067,401. Among the various differences between the disclosure of that patent and the present invention, one significant one that may be mentioned is that in the prior patented practice relatively more time and power was required for the press to reverse itself at the end of a degassing partial stroke before proceeding again along its compression path. Still other prior practices were also slower, or more expensive, or subjected the material to be treated to greater risk of detriment in the course of the operation than the present invention does.

By means of the present invention, the foregoing difficulties have been overcome. In a compression stroke, the major mass of the press moves continuously and without interruption both during the degassing and during the final compression bonding of the solid material being treated. A second member which may be in the form of an auxiliary platen carried by a main press platen moves relative thereto. In the course of that movement which is rapid and which may be manually or automatically controlled in whatever manner may be desired, the second member effectively degasses or deairs the charge of solid particles to be molded and then acts with the main part of the press as a unit in effecting final pressure bonding of that degasified or deaired material.

Other objects and advantages will be apparent from the following description and from the accompanying drawings, which are illustrative only, in which—

Figure 1 sets forth one embodiment which this invention may take, which embodiment is shown at rest ready for the initiation of a degasifying and pressure bonding operation;

Figure 2 illustrates the main components of the embodiment shown in Figure 1 but in the course of the first stage following upon the initiation of a cycle of operations in accordance with my invention;

Figure 3 shows the embodiment of Figure 1 with the stage illustrated in Figure 2 having reached a point where the charge is being degasified or deaired as the case may be;

Figure 4 shows the embodiment of Figure 1 in a stage immediately succeeding the completion of the degasifying or deairing step;

Figure 5 shows the embodiment of Figure 1 in the course of the final pressure bonding step during the working stroke;

Figure 7:
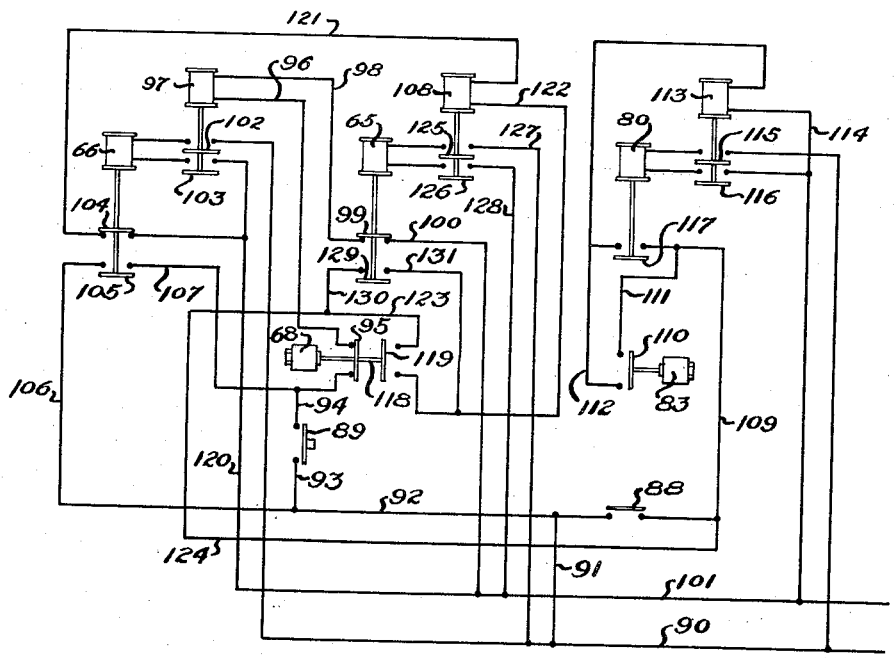

Figure 6 sets forth the embodiment of Figure 1 with the return stroke completed and the finally compressed charge in the course of being ejected from the mold; and Figure 7 illustrates a circuit which may be utilized with the embodiments set forth in the Figures 1 to 6, if desired, to provide semiautomatic operation thereof.

Referring to the drawings, 10 may indicate a vertical press, which in the embodiment is hydraulic. That press may be provided with a frame comprising a base 11 and a head 12 connected by strain columns 13. A double acting hydraulic cylinder casing 14 may be rigidly attached to head 12. Within casing 14 a piston 15 rigidly connected to a rod 16 may be adapted to reciprocate between end plates 17 and 18 on cylinder 14. The lower end of rod 16 may be rigidly coupled to a main platen 19 having drilled openings 20 at the corners thereof through which openings 20 the columns 13 pass in slidable relation to main platen 19. An auxiliary platen 21 extends across the underside of main platen 19 and in the position shown in Figures 1, 4, 5 and 6 is in abutting contact with main platen 19. Auxiliary platen 21 is a second platen or member which also has openings 22 at the corners thereof through which strain columns 13 pass in relatively slidable relation during the operation of the new apparatus. Openings 22 are in registry with openings 20.

Auxiliary platen 21 is connected to main platen 19 in vertically movable relation by slide rods 23 to the lower ends of which in the embodiment shown are threadably attached to member 21. Openings 24 in platen 19 are provided for the upward passage of rods 23. A keeper washer 25 and retaining nut 26 attached to the threaded upper end of the slide rods 23 is also provided on each such slide rod. A guide collar 27 surrounds each slide rod and has a flanged base 28 which seats on the top surface 29 of platen 19. A spring 30 extends in compressed relation between washer 25 and flange 28 in all relative positions of the second member 21 to the main member 19. Preferably, collar 28 is secured to main platen 19. Thereby, the bore 31 of collar 27 guides the slide rods 23 and thereby second member 21 in its relative vertical movements. At the same time the exterior of collar 27 above flange 28 centers springs 30.

Single acting hydraulic cylinder casings 32 are mounted on main platen 19 in appropriately spaced relation for the maximum separation to be provided between the platens 19 and 21 during those stages of an operation when there is to be such a separation. Thus casings 32 are in symmetrical relation relative to piston rod 16 and have flanges 33 fastened to platen 19 as by studs 34 and nuts 35. Spacing collars 36 around the studs 34 keep casing 32 in appropriate relation relative to main platen 19. A plunger 37 is slidably mounted in the interior of casing 32 and extends through a packing gland 38 on the underside of the auxiliary cylinders 32. The lower ends of the plungers 37 are threaded and shown at 39 and thereby secured in drilled and tapped holes 40 in the second platen 21. Hence, when auxiliary platen 21 is controlled by the influence of springs 30 the upper surface 41 of platen 21 is in contact with the lower surface 42 of main platen 19. On the other hand, when the plungers 37 are in control and moved downwardly relative to casing 32 by the admission of hydraulic fluid, which may be oil, into the interior space 43 of the casing 32 through the ports 44, surfaces 41 and 42 separate. The maximum separation is shown in Figure 2 with the plungers 37 fully extended and the springs 30 fully compressed, with the underside of washer 25 coming into contact with the top edge 45 of collar 27 to stop and limit the downward movement of auxiliary platen 21 relative to main platen 19. The aggregate of the cross-sectional areas of the plungers 37 is substantially less than the area of the piston 15, in the embodiment shown. When the pressure on the hydraulic fluid is released the ports 44 act as exit ports and the springs 30 quickly return platen 21 to the position shown in Figure 1 relative to platen 19 even though platen 19 may be moving.

The underside of auxiliary platen 21 may be provided with the male part 46 of a mold in which solid particles are placed for degasifying and pressure shaping and bonding. The die 46 is preferably rigidly secured to the underside of member 21. The female part 47 of the mold may be secured to base 11 of the new apparatus and be, in the embodiment shown, in the form of a rectangular cup having vertical internal side walls 48 and an opening 49 at the top through which die 46 may pass so that its vertical sides 50 are very close to the corresponding sides 48 as the die 46 moves into the interior of lower mold part 47. Generally, a clearance in the order of one or two thousandths of an inch between the corresponding vertical sides 48 and 50 if any portion of die 46 is within cup 47, will be sufficient to permit gas or air forced out from among the solid particles by such entry of die 46 into cup 47 to at least begin to escape. A bottom part 50a may be provided for the mold, said part 50a being in slidable close fitting relation to the sides 48 of the cup 47. A downwardly extending stem 51 from the underside of bottom 50a may pass through an opening 52 in base 11. The lower end of stem 51 may rest against an arm of an ejection lever 53 pivoted at 54 to the underside of base 11. Handle 55 may be provided as an integral part of lever 53 and made heavy enough to keep end 56 of lever 53 resting against the lower end of stem 51. When the new device is at rest, the weight of bottom part 50a is sufficiently heavy so that it will remain at the bottom of cup 47 irrespective of whether there is any charge of solid particles or material in cup 47.

Piston 15 and its rod 16 are double-acting in the embodiment shown. Rod 16 extends through plate 18 of cylinder 14 and through a packing gland 57. A port 58 in end plate 17 acts to admit hydraulic fluid to the spaces 43 in auxiliary cylinders 32 and to the head end of piston 15 when the auxiliary platen 21 and the main platen 19 are moved downwardly. When main platen 19 is moved upwardly port 58 acts as an exit port. End plate 18 is provided with a port 59 which acts as an admission port for hydraulic fluid when piston 15 and therefore rod 16 and platen 19 are moved upwardly. When rod 16 is moved downwardly the port 59 acts as an exit port for hydraulic fluid on the rod side of piston 15. A passage 60 is provided through the length of rod 16 the upper end of said passage opening into the space within cylinder 14 on the head end side of piston 15. The lower end of passage 60 is in open communication with a cross passage 61 connecting passage 60 with a fitting 62 secured to rod 16. The interior of fitting 62 is in open communication with cross passage 61 and the lower end of passage 60.

A hydraulic liquid circuit is provided which in the embodiment shown comprises an inlet pipe 63. Pipe 63 is under the pressure of a pump or other pressure source for the hydraulic fluid used in operating the new system and such hydraulic fluid will flow inside pipe 63 in the direction of the arrow shown in Figure 1 whenever a four-way valve 64 permits. Valve 64 may be solenoid operated and a solenoid 65 attached thereto may control a movable member within valve 64 for upward movements of piston 15 and rod 16. Another solenoid 66 may control valve 64 when downward movement of piston 15 and rod 16 is desired. When neither solenoid 65 nor solenoid 66 is energized, the construction of valve 64 may be made such that it is in neutral position shutting off the end of pipe 63 connected thereto so that no hydraulic fluid will flow through pipe 63 when valve 64 is in such neutral position. Valve 64 will be in such neutral position when the new device is at rest between pressure degassing and bonding cycles.

When valve 64 is under the control of solenoid 66 a pipe 67 will receive hydraulic fluid from pipe 63 and carry that hydraulic fluid to port 58. A pressure responsive bonding switch 68 may be connected to pipe 67 by a T-fitting 69. When pipe 67 is thus opened to hydraulic fluid from pipe 63 a pipe 70 communicating with the rod end of piston 15 will be placed in communication with a pipe 71 which in turn communicates with an exhaust pipe 72 through a fitting 73. The exhaust pipe 72 may lead hydraulic fluid being exhausted from the new device back to the liquid reservoir (not shown) from which the pressure source for pipe 63 may take its suction. A pressure sustaining valve 74 is connected in the circuit of pipe 70. Pressure sustaining valve 74 may be spring-loaded to a predetermined pressure by a spring in bonnet 75 so that hydraulic fluid exiting through port 59 during the downward movement of piston 15 and rod 16 must overcome such predetermined pressure before it will flow out through port 59, pipe 70, valve 74 to exhaust pipe 72. In the embodiment shown, the portion of pipe 70 connected between valve 74 and port 59 may extend through an opening 76 in head 12. During the exiting of hydraulic fluid through port 59, a three-way valve 77 is positioned so that such hydraulic fluid being exhausted from the rod end of piston 15 must pass out through exhaust pipe 72 and will not enter a pipe 77a connected to the other side of fitting 73.

Under the control of solenoid 66, before piston 15 and rod 16 move downwardly, because of the predetermined pressure sustained by valve 74, hydraulic fluid admitted through port 58 from pipe 67 passes downwardly through passage 60 and out through cross passage 61, fitting 62 and a pipe 78 having a one-way check valve 79 therein permitting such hydraulic fluid to enter three-way valve 77. Three-way valve 77 is under the control of a solenoid 80 so that the hydraulic fluid entering from passage 60 passes into a pipe 81 and thence into a manifold 82 where it is conducted to the ports 44 of the cylinder casings 32. A degasifying pressure responsive switch 83 is in communication with manifold 82 through a fitting 84. The predetermined pressure setting of sustaining valve 74 is such that upon the flow of hydraulic fluid through pipe 67, auxiliary platen 21 effects its maximum separation from platen 19, in the embodiment shown, as illustrated in Figure 2, before piston 15 and rod 16 begin to move downwardly by virtue of the pressure build-up at the head end of piston 15 when the downward movement of the washers 25 is arrested by the tops 45 of the collars 27. Upon such arresting, piston 15 and rod 16 begin a downward movement which in the device illustrated is not interrupted until final pressure bonding of a charge 85 of solid particles placed within cup 47 has been completed. Piping details illustrated in Figure 1 apply equally to the successive stages shown in Figures 2 to 6, inclusive, although not shown therein.

As shown in Figure 3 my new device as illustrated retains the separation effected by the auxiliary platen 21 and main platen 19 shown in Figure 2 during the initiation and carrying out of the downward movement of piston 15 and rod 16 during the degasifying portion of the cycle. Thus, as shown in Figure 3, die 46 has entered cup 47 and given the initial or degasifying compression to the charge 85. The volume of charge 85 may be reduced by as much as one-half or more during such degasifying or deairing as shown in Figures 3 and 4. Such first stage compression effected in the degasifying and deairing step removes a large volume of entrained or otherwise incorporated air or gas in the solid particles originally charged to mold cup 47, as shown in Figure 1. A control for the amount of initial compression effected by the Figure 3 step of the new operation is provided through degasifying pressure switch 83. Thus, as the initial compression is effected, the pressure of the hydraulic fluid in the spaces 43 rises through the resistance force conducted through die 46, auxiliary platen 21 and the plungers 37. Upon that last-mentioned pressure increase reaching a predetermined figure matching the setting of switch 83, the action of solenoid 80 is reversed, changing the valving in valve 77 to open manifold 82 through pipe 81 and place it in communication with pipe 77a and thereby permit the spaces 43 to have hydraulic fluid therein rapidly exhausted through pipe 72. Such rapid exhausting of the spaces 43 permits the springs 30 to snap auxiliary platen 21 back into contact with main platen 19, the descent of which is continuing as shown by the arrow on rod 16 in Figure 4. Such reversal of movement of auxiliary platen 21 relative to platen 19, between the positions of platen 21 from that shown in Figure 3 to that shown in Figure 4 constitutes a reversing movement of relatively small mass and inertia. Hence, it may be effected with rapidity and without the application of large forces. Moreover, the movement of platen 21 back against platen 19 opens cup 47 above the partially compressed and still porous charge 85a to ensure the escape of any gas or air not previously escaping in the small clearance between the sides 48 and 50 when the die 46 and cup 47 are in the course of interengagement as shown in Figure 3.

With main platen 19 and auxiliary platen 21 reunited as shown in the step illustrated in Figure 4, the downward movement of piston 15, rod 16 and main platen 19 continues without interruption while auxiliary platen 21 returns to a downward course causing die 46 to immediately re-enter cup 47 and effect final compression and pressure bonding of the charge by a further reduction of its volume as shown by the finally bonded charge volume 85b in Figure 5.

The descent of piston 15, rod 16, main platen 19 and auxiliary platen 21 is completed when the charge 85 has been reduced to the final degasified and pressure bonded volume corresponding to the volume of briquet 85b. Achievement of that final pressure bonding may be obtained with uniformity and without striking of metal parts against one another through the medium of the further pressure responsive switch 68. The resistance offered to further compression of the finally bonded charge in the volume shown as 85b in Figure 5 is such that that resistance force is transmitted through die 46, platen 19, rod 16 and piston 15 to the hydraulic fluid at the head end of piston 15 overcoming the predetermined pressure setting in switch 68 which in turn shifts control of valve 64 from solenoid 66 to solenoid 65. When solenoid 65 is in control, hydraulic liquid under pressure from pipe 63 is conducted into pipe 70 and pipe 67 is shut off therefrom. Since valve 74 offers no resistance to the flow of hydraulic fluid toward port 59, hydraulic fluid under pressure from pipe 63 rapidly enters cylinder 14 on the rod side of piston 15 and moves piston 15, rod 16, and platens 19 and 21 with die 46 rapidly upward. During such upward movement of piston 15, pipe 67 is opened directly to pipes 71 and 72 through valve 64. The pipe 77a may extend through an opening 86 in head 12 and is flexible and looped at least at the lower end thereof sufficiently to accommodate the length of the strokes of piston 15.

Upon piston 15 and rod 16 reaching their uppermost positions, a bracket 87 mounted on main platen 19 may engage a limit switch 88 to stop the operation if semiautomatic operation is provided. Thereupon, handle 55 of lever 53 may be depressed as shown in Figure 6 raising the degasified and final pressure bonded shape 85b of solid particles to the top of cup 47 where it may readily be removed. Thereupon, handle 55 is released and bottom part 50a returns of its own weight in cup 47 to the position shown in Figure 1 where it and cup 47 are ready for a new charge 85 and a new degasifying and final pressure bonding cycle.

An electrical circuit which may be utilized in conducting a semiautomatic operation of the pressure bonding system of this invention is illustrated in Figure 7. It will be recognized that manual operation or fully automatic operation may readily be devised by those skilled in the electrical art to whom this invention is disclosed and, further, that other semiautomatic or combination circuit arrangements may similarly be provided. In the circuit arrangement shown in Figure 7 a normally open push-button switch 89 may be pushed to closed position to initiate a complete degasifying and final pressure bonding cycle for a single charge of solid particles to be formed in the mold 46—47 in the embodiment of this invention shown in the drawings. When switch 89 is closed electrical current will flow through a wire 90, 91, 92, 93, switch blade 89, 94, switch blade 95 which is normally closed, wire 96, magnetic contactor coil 97, wire 98, switch blade 99 which is normally closed, wire 100 and wire 101, the wires 90 and 101 being the power source having an appropriate voltage differential. As shown in Figure 7, the circuit represents an at rest condition for the apparatus which is also at rest and in a position as shown in Figure 1. The closing of switch 89 as aforesaid initiates the cycle.

The energizing of coil 97 as described raises switch blades 102 and 103 which are normally open into closed position completing a circuit through solenoid 66. The energizing of solenoid 66 in turn opens the normally closed switch blade 104 and closes the normally open switch blade 105. Switch blade 105 when closed completes a seal-in circuit through wires 106 and 107 around push button 89 which returns, when released after momentary contact, to normally open position. The opening of switch blade 104 keeps a magnetic contactor 108 out of the circuit so that solenoid 65 is prevented from influencing valve 64 during the control thereof by solenoid 66. The control by solenoid 66 of valve 64 shifts the movable internal valve parts for operation as described above. When neither solenoid 65 nor solenoid 66 is energized in the normal at rest positions of both the circuit in Figure 7 and of the apparatus as shown in Figure 1, the movable internal parts of valve 64 are centered and no flow of hydraulic fluid takes place through that valve 64.

When piston 15 and rod 16 begin to move downwardly, after momentary closing of switch 89 and the separation of auxiliary platen 21 from main platen 19, bracket 87 disengages itself from limit switch 88 causing said limit switch which is normally open when the new device is at rest, to close, connecting wire 109 to the power line 90. As the degasifying step takes place as shown in Figure 3, when the pressure of the hydraulic fluid in the spaces 43 exceeds the pressure setting of degasifying pressure switch 83, a switch blade 110 controlled by switch 83 is pushed from its normally open into closed position, completing a circuit from wire 109 through wire 111, switch plate 110, and wire 112, through a magnetic contactor coil 113 and a wire 114 to the other power line 101. Energizing of coil 113 brings normally open switch plates 115 and 116 into respectively closed position completing the circuit to solenoid 80 and energizing the same. Energizing of solenoid 80 moves normally open switch plate 117 into closed position completing a seal-in circuit through coil 113 and at the same time shifting the position of the internal movable valve parts in valve 77, as described above, to place pipe 81 in communication with pipe 77a and exhaust pipe 72 for rapid upward return of secondary platen 21 to the underside of main platen 19 with the surfaces 41 and 42 respectively in contact. When pipe 81 is in such communication with pipe 77a, pipe 78 is shut off from communication either with pipe 81 or with pipe 77a and remains that way until the new device returns to its at rest position following the completion of the downward stroke and the upward return stroke of the piston 15 and rod 16. Following the degasification or partial compression and the return of secondary platen 21 into contact with main platen 19 while main platen 19 continues its downward course without interruption, the final compression of the charge being formed into a degasified and pressure bonded shape or briquet 85b is made, as illustrated in Figure 5. At that point at which the resistance of the briquet 85b to further compression acts upon the hydraulic fluid of the head end of piston 15 sufficiently to overcome the pressure setting of bonding pressure switch 68, the stem 118 of switch 68 is shifted opening normally closed switch blade 95 causing switch blades 102 and 103 to drop out deenergizing solenoid 66. Deenergization of solenoid 66 returns switch blade 104 to its normally closed position and switch blade 105 to its normally open position. The movement of stem 118 upon such final compression overcoming the setting in switch 68 also moves switch blade 119 of its normally open to a closed position, completing a circuit for the energization of magnetic coil 108 through wire 101, wire 120, switch blade 104, wire 121, wire 122, switch blade 119, wire 123, wire 124, limit switch 88, wire 91 to the other power line 90.

The energization of contactor coil 108 moves normally open switch blades 125 and 126 into closed positions respectively completing an energizing circuit for solenoid 65 through wires 127 and 128 respectively to power lines 90 and 101. The energization of solenoid 65 in addition to moving the internal parts of valve 64 to send hydraulic fluid through pipe 70 and port 59 into cylinder 14 on the rod side of piston 15 as described above, also opens normally closed switch blade 99 and closes normally open switch blade 129. The opening of switch blade 99 from its normally closed position insures the continued deenergization of coil 97 when switch blade 95 returns to its normally closed position upon release of the pressure actuating pressure switch 68 at the instant the final compression bonding pressure takes place. The closing of switch blade 129 from its normally open position sets up a seal-in circuit through wires 130 and 131 and 122 for coil 108. With solenoid 65 so energized, piston 15, rod 16 and main platen 19, carrying with it secondary platen 21 rapidly move upwardly as described earlier until bracket 87 returns switch blade 88 to its normally open position when the machine is at rest. The opening of limit switch 88 cuts out coil 113 and hence deenergizes solenoid 80. Pressure switch 83 has in the meantime returned its switch blade 110 to normally open position, such pressure switches as 83 and 68 may be spring set for automatic return to initial position when the pressure is reduced below their respective settings. At the same time, when switch 88 is opened, coil 108 is deenergized dropping out switch blades 125 and 126 which in turn deenergize solenoid 65. The absence of energization of solenoids 65 and 66 maintains valve 64 in neutral position as described earlier. Hence the opening of switch 88 upon completion of the return stroke of the new device shown in Figures 1 to 6 causes the new device to come to rest, a single cycle of operations having been completed and all valves and switches having been returned to their normal at rest positions. When a new cycle is to be commenced after a fresh charge of solid particles to be degassed or deaired and finally pressure bonded has been placed in cup 47, push button 89 is closed and a further cycle will automatically take place.

Various modifications may be made in the new device and method of this invention without departing from the spirit thereof or the scope of the appended claims.

I claim:

1. In a press, apparatus comprising, in combination, a frame, a main platen, a hydraulic cylinder mounted on said frame for moving said main platen, an auxiliary platen supportably connected to said main platen, a compression die part carried by said auxiliary platen, said auxiliary platen being movable relative to said main platen, means connected to a pressure source and mounted on said main platen for moving said auxiliary platen relative to said main platen during a press stroke of said main platen, further means mounted on said main platen for returning said auxiliary platen toward said main platen when a predetermined force is exerted by said auxiliary platen while it is in separated relation to said main platen, said further means including means to disconnect said auxiliary platen from said pressure source when said predetermined force is reached, and a cupped mold part mounted on said frame in relatively fixed opposed relation to said die part to be entered by said die part in the course of a pressing operation.

2. In a press, apparatus comprising, in combination, a main platen, means for moving said platen, an auxiliary platen movably connected to said main platen and adapted to be spaced therefrom during a portion of the operation period of said main platen, a compression die part carried by said auxiliary platen, means connected to a pressure source for effecting such spacing of said auxiliary platen relative to said main platen, pressure responsive means mounted on said main platen to release said means for effecting such spacing by disconnection from said pressure source when a predetermined pressure is exerted by said auxiliary platen while spaced from said main platen, means to return said auxiliary platen upon such release toward said main platen during a press stroke of said main platen, and a cupped die part supported in relatively fixed opposed relation to said compression die part to be entered by said compression die part in the course of a pressing operation.

3. In a pressure bonding mechanism, apparatus comprising, in combination, a frame, a main platen movable relative to said frame, a hydraulic cylinder mounted on said frame to move said main platen, an auxiliary platen mounted on said main platen, a compression die part carried by said auxiliary platen, an auxiliary hydraulic cylinder mounted on said main platen to separate said auxiliary platen from said main platen, means operatively connected to said main platen to return said auxiliary platen into contact with said main platen in the course of a press stroke of said main platen, and means to transfer control of said auxiliary platen from said auxiliary hydraulic cylinder to said first-mentioned means.

4. In a press, apparatus comprising, in combination, a main platen having a working stroke and a return stroke, means for moving said platen through said strokes, an auxiliary platen movably connected to said main platen and adapted to be spaced therefrom during at least a portion of said working stroke of said main platen, a compression die part carried by said auxiliary platen, means connected to a pressure source for maintaining such spacing of said auxiliary platen relative to said main platen during such portion of the working stroke of said main platen, pressure responsive means mounted on said main platen to release said means for maintaining such spacing by disconnection from said pressure source, means to return said auxiliary platen upon such release in a reverse direction toward said main platen during said working stroke of the latter, further pressure responsive means to determine the extent of the working stroke of said main platen, and a cupped die part supported in relatively fixed opposed relation to said compression die part to be entered by said compression die part in the course of a pressing operation.

5. In a pressure bonding mechanism, apparatus comprising, in combination, a main platen having a working stroke and a return stroke, fluid pressure means for moving said main platen through said strokes, an auxiliary platen connected to said main platen, a compression die part carried by said auxiliary platen, fluid pressure means on said main platen to move said auxiliary platen away therefrom, resilient means mounted on said main platen to move said auxiliary platen toward said main platen, means to maintain said auxiliary platen in spaced relation to said main platen during a portion of said working stroke of said main platen, pressure responsive means to transfer control of said auxiliary platen from said second-named fluid pressure means to said resilient means in the course of a working stroke of said main platen, and further pressure responsive means to which said first-named fluid pressure means are responsive to reverse and move said main and auxiliary platens together along said return stroke.

6. In a pressure bonding mechanism, apparatus comprising, in combination, a frame, a main platen having a working stroke and a return stroke, a hydraulic cylinder mounted on said frame to move said main platen through said strokes, an auxiliary platen mounted on said main platen, a die to compress solid particles mounted on said auxiliary platen on the side away from said main platen, means mounted on said main platen to force said auxiliary platen a predetermined distance away from said main platen, a cup for solid particles in alignment with the path of movement of said die, means to maintain said auxiliary platen spaced from said main platen when said die first enters said cup to degasify said solid particles therein, resilient means mounted on said main platen to return said auxiliary platen toward said main platen substantially to withdraw said die from said cup following such degasification without interrupting the working stroke of said main platen, and pressure responsive means to transfer control of said auxiliary platen to said resilient means when said degasification compression has proceeded to a predetermined extent.

7. In a pressure bonding mechanism, apparatus comprising, in combination, a frame, a main platen having a working stroke and a return stroke, a hydraulic cylinder mounted on said frame to move said main platen through said strokes, an auxiliary platen mounted on said main platen, a die to compress solid particles mounted on said auxiliary platen on the side away from said main platen, means mounted on said main platen to force said auxiliary platen a predetermined distance away from said main platen, means on said main platen to limit the extent of said predetermined distance, a cup for solid particles in alignment with the path of movement of said die, means to maintain said auxiliary platen spaced from said main platen when said die first enters said cup to degasify said solid particles therein, resilient means mounted on said main platen to return said auxiliary platen toward said main platen substantially to withdraw said die from said cup following such degasification without interrupting the working stroke of said main platen, pressure responsive means to transfer control of said auxiliary platen to said resilient means when said degasification compression has proceeded to a predetermined extent, means for continuing the working stroke of said main platen with the auxiliary platen rejoined thereto to cause said die to re-enter said cup and effect the final compression and bonding of said solid particles, and further pressure responsive means to transfer control of said main platen to the return stroke mechanism when said main platen with the auxiliary platen rejoined thereto has caused such final compression.

8. In a pressure bonding method, the steps comprising, in combination, moving an auxiliary platen away from engagement with a main platen by fluid pressure, moving said main platen by fluid pressure in the direction said auxiliary platen was moved with said auxiliary platen leading, compressing material in a cupped mold by means of said auxiliary platen until said auxiliary platen reaches a predetermined pressure setting, disconnecting said auxiliary platen from said first-mentioned fluid pressure when it reaches said setting and maintaining said disconnection to cause said auxiliary platen to return rapidly into engagement with said main platen without affecting movement of said main platen, further compressing said material by engagement with said auxiliary platen while in re-engagement with said main platen until said second-mentioned fluid pressure reaches a predetermined pressure setting, and releasing said second-mentioned fluid pressure when said last-mentioned predetermined pressure setting is reached.

9. In a pressure bonding method, the steps comprising, in combination; providing a main platen and an auxiliary platen of relatively lighter mass carried thereby, moving said auxiliary platen away from engagement with said main platen by fluid pressure, at least holding said main platen against movement in a direction opposite to the direction of and during said first-named movement of said auxiliary platen, moving said main platen by fluid pressure in the direction of movement of said auxiliary platen with said auxiliary platen leading, compressing material in a relatively stationary cup mold between said auxiliary platen and said cup mold until said first-mentioned fluid pressure reaches a predetermined pressure setting, disconnecting said auxiliary platen from said first-mentioned fluid pressure when it reaches said setting, maintaining said disconnection and rapidly returning said auxiliary platen upon said disconnection into engagement with said main platen without interrupting the movement of said main platen, further compressing said material between said main platen with said auxiliary platen in re-engagement therewith and said stationary cup mold until said second-mentioned fluid pressure reaches a higher pressure setting, releasing said second-mentioned fluid pressure when it reaches said higher pressure setting to return said main platen with said auxiliary platen in re-engagement therewith to starting position and away from said stationary cup mold.

References Cited in the file of this patent

UNITED STATES PATENTS

| | | |
|---|---|---|
| 1,190,912 | Koller | July 11, 1916 |
| 2,067,401 | Lassman | Jan. 12, 1937 |
| 2,336,982 | Cremer | Dec. 14, 1943 |
| 2,342,772 | Wellman | Feb. 29, 1944 |
| 2,482,342 | Hubbert et al. | Sept. 20, 1949 |

FOREIGN PATENTS

| | | |
|---|---|---|
| 267,486 | Switzerland | June 16, 1950 |